Patented Mar. 11, 1941

2,234,569

UNITED STATES PATENT OFFICE 2,234,569

HYDROPHOBE PHENOL - FORMALDEHYDE RESIN AND METHOD OF MAKING SAME

Karl Loos, Lancaster, Pa.

No Drawing. Application February 27, 1937,
Serial No. 128,277

2 Claims. (Cl. 260—43)

The present invention relates to phenol-formaldehyde resins of the type adapted for casting and has for its general object to provide an improved method of producing easily machinable cast resins of any desired degree of light-transmitting characteristics, from a glass-clear transparency to substantially complete opacity, and particularly a brilliant and lustrous white, opaque product. The present application is a continuation-in-part of my earlier application Serial No. 675,095, filed June 9, 1933.

In Reissue Patent No. 19,710 to Friz Pollak and Alphons Ostersetzer, a process is described for the production of a cast white resin characterized by the use of a relatively large amount of formaldehyde (1 mol of phenol to 2½ or more mols of formaldehyde) and of a relatively large quantity of a strong base as a catalyst, and by the maintenance of the reaction product in the clear hydrosol condition at least in the latter stages of formation of the resin, that is, at least in the stage prior to the dehydration and during the dehydrating treatment. If any resin precipitates during the reaction, as when the initial condensation is conducted in the presence of an acid catalyst that is, when the resin becomes hydrophobe, it is converted to the sol (hydrophilic) condition by the addition of a large amount of alkali metal hydroxide, the latter being subsequently neutralized with the exactly equivalent amount of acid, the resin consequently remaining in the sol condition. The resin is poured while still in the sol condition and the sol is converted into an insoluble gel only during the hardening in the mould, and as the gel polymerizes and hardens to its final condition water separates out from the resin and becomes dispersed within the solid resin in the form of droplets of colloidal order of magnitude. To obtain this result, according to the patent, it is necessary to employ far larger than equimolecular proportions of formaldehyde with reference to phenol, molecular proportions of about 2½ or more to 1 being stated to give the most favorable results. The resinous condensate must also be brought into the state of colloidal dispersion with the aid of a large amount of base, from which dispersion the resin does not precipitate and which is slowly concentrated to a true jelly wherein is distributed the dispersing medium. In the patented process, therefore, it is essential among other things that the resin must not assume the character of a precipitate, that is, of a hydrophobic resin, as it dehydrated. To the microscopic droplets of water is due the white color of the product.

I have found that a cast, white resin of excellent machinability and of a brilliance and lustre unequalled by any phenol-formaldehyde resin known to me or by any material obtainable in accordance with the process of the patent referred to above, can be obtained by hardening a precipitated, hydrophobic phenol-formaldehyde resin in which the molecular proportion of formaldehyde to phenol may be of the usual order (about 1.2 to 1) or in large excess (about 2.4 to 1). The resin is precipitated from its aqueous colloidal solution prior to the dehydration, a two-phase system being produced. In spite of the fact that the final product consists of a hardened hydrophobic precipitate, it contains droplets of what appear to be water distributed therein, the material having a sponge-like appearance under the microscope, the droplets being in large part, and in certain instances practically entirely, of colloidal size, that is, about $10\mu$ or less.

By my improved process, furthermore, it is possible to obtain not only opaque but also transparent and semi-transparent products.

In carrying out the present invention, phenol and formaldehyde in molecular proportions of about 1 to 1.2 or more are condensed with such a large proportion of basic condensing agent that a colloidal solution of the resin is produced. The resinous condensate is then acidified to such an extent that either immediately or after further condensation the resin is precipitated. The mixture may be allowed to settle and the resin separated from the water by decanting or syphoning, but it is generally preferable to distil the mixture, the resin becoming further condensed during the dehydration. Throughout the dehydration and the hardening period the resin is in a definitely hydrophobe condition, the hardened cast product comprising a cured hydrophobe resin. In this resin, particularly when it is of translucent or opaque character, are trapped particles of water representing water of reaction and perhaps also water retained by the resin from its original solution, the particles (or hollows in the resin) being for the most part of colloidal size.

The invention will be described in greater detail with the aid of the following examples:

Example 1

| | |
|---|---|
| Phenol | part__ 1 |
| 37% formaldehyde | do____ 1 |
| NaOH (based upon the weight of the phenol) | per cent__ 1 |

(all parts by weight) are condensed at the boiling point under reflux until a liquid resinous material is formed. There are then added

| | |
|---|---|
| 37% formaldehyde | part__ 1 |
| NaOH (based on the phenol) | per cent__ 1½ | and the mixture is further condensed for a short time, after which the still liquid material is acidified with an organic acid, such as lactic, acetic, or phthalic acid, the mass being further condensed in the acid medium. After about 30 minutes the resin begins to separate from the water; the latter may be syphoned off, after which the resin is distilled up to about 55–65° C. under a high vacuum. About 10% of glycerine based upon the weight of the phenol is then added, the condensate being still liquid at such time. The mass is stirred and the distillation is continued under vacuum until the resin reaches a viscous state wherein it contains only a very small amount of water. The resin is then poured and hardened at about 70–80° C. for two to three days. The product is translucent and when examined under the microscope under diffused light showed a large number of cylindrical droplets about 20 to 25μ long and 5 to 8μ in diameter. The material is hard and strong, takes on a high polish and can be easily machined.

Example 2

|  | Grams |
|---|---|
| Phenol | 200 |
| Formaldehyde (37% by weight) | 200 |
| NaOH | 2 | are boiled for about 15 minutes under reflux. There are then added

|  | Grams |
|---|---|
| Formaldehyde (37%) | 200 |
| NaOH | 3 | the boiling being continued for an additional 30 minutes. The condensate is then cooled and 30 grams of acetone are added, the condensation being continued for about 10 minutes, when the visible reaction practically ceases. The mass is then acidified with lactic acid, whereupon separation of the resin from the water takes place. The mass is distilled, and when the desired degree of viscosity and water removal has taken place, the semi-liquid resin is poured and then hardened for about two days at about 70–80° C. The product is a hard, tough, translucent, hornlike material which can be turned, drilled, etc.

Example 3

|  | Grams |
|---|---|
| Phenol | 500 |
| Formaldehyde (37%) | 500 |
| NaOH | 5 | are boiled for 15 minutes, whereupon

|  | Grams |
|---|---|
| Formaldehyde (37%) | 500 |
| NaOH | 5 | are added and the mixture boiled for 25 minutes. The colloidal, resinous solution so obtained is acidified with 30 cc. of lactic acid, and 50 cc. of diethyl-phthalate are added. The mixture is then boiled for 40 minutes more. A hydrophobe resin separates out and is distilled under vacuum. At 50° C. during the distillation 50 cc. of glycerine are added and the mixture further distilled up to 84° C. under high vacuum. The mass is hardened for four days at 75 to 80° C., yielding a hard, translucent material which is exceptionally strong and has very satisfactory working qualities.

If desired the diethyl-phthalate may be omitted, in which case the dehydration must be stopped at an earlier stage to avoid converting the resin into such a viscous condition as to make it difficult to pour it. The product will be somewhat more opaque than that just described.

Example 4

|  | Grams |
|---|---|
| Phenol | 100 |
| Formaldehyde (37%) | 200 |
| NaOH | 2½ | are condensed at a temperature of about 70° to 75° C. for about one and one-half hours and then brought to boiling under reflux for about 20 minutes. The mass is then acidified with an organic acid, such as lactic, and 5 grams of methyl-phthalyl-ethyl-glycollate or other plasticizer are added. The mixture is further condensed in the acid medium until the resin separates from the water, which usually requires about 20 to 30 minutes. After adding about 10% of glycerine (based on the phenol) the mass is distilled under high vacuum until it is substantially completely dehydrated, at which time the resin is in the form of a heavy viscous mass. It is then cast and hardened for 4 to 5 days at about 70°–80° C. and yields a transparent, almost colorless resin which is very hard and tough and can be subjected to the usual machining operations.

Example 5

|  | Grams |
|---|---|
| Phenol | 200 |
| Formaldehyde (37%) | 300 |
| KOH | 4 | are boiled under reflux for about 50 minutes and the resulting condensate is then acidified with an organic acid of the type above described. The mass is further condensed until separation of a hydrophobe resin takes place. 30 cc. of methyl-phthalyl-ethyl-glycollate are now added and the mass distilled in a high vacuum, the resin remaining, as in the preceding examples, in the hydrophobe condition, and when a highly viscous state is reached it is cast in molds. After hardening for about 4 days at 70°–80° C., a transparent, nearly colorless material is obtained which machines very easily.

I claim:

1. A machinable, infusible phenol-formaldehyde resin, comprising the cured hydrophobe resin obtained by condensing phenol and formaldehye in the molecular proportion of approximately 1:2.4 in the presence of a sufficient quantity of basic catalyst to produce a colloidal solution of the condensate, followed by addition of acetone, acidification of the colloidal solution, further condensation and distillation of the separated resinous condensate until it is a viscous liquid and finally curing of such liquid.

2. The method of producing machinable, cast phenol-formaldehye resins, which comprises condensing approximately 200 grams of phenol with 200 grams of 37% formaldehye in the presence of 2 grams of alkali metal hydroxide at the boiling point, adding 200 grams of 37% formaldehyde and 3 grams of the hydroxide and continuing the condensation at the boiling point, cooling the condensate and adding thereto about 30 grams of acetone, further condensing the mixture, acidifying the same with an organic acid, whereupon separation of the resin from the water takes place, distilling the resin under vacuum, and then pouring and curing the resin.

KARL LOOS.